US012795474B2

(12) United States Patent
Vivanco et al.

(10) Patent No.: US 12,795,474 B2
(45) **Date of Patent: *Nov. 10, 2026**

(54) OVERCOMING NEIGHBOR RELATION TABLE CONFLICTS AMONG TERRESTRIAL AND AERIAL CELLS IN MOBILE TELECOMMUNICATIONS NETWORKS

(71) Applicants: AT&T Technical Services Company, Inc., Vienna, VA (US); AT&T Intellectual Property I, L.P., Atlanta, GA (US)

(72) Inventors: Daniel Vivanco, Ashburn, VA (US); David Beppler, Duluth, GA (US); Slawomir Stawiarski, Carpentersville, IL (US)

(73) Assignees: AT&T Technical Services Company, Inc., Vienna, VA (US); AT&T Intellectual Property I, L.P., Atlanta, GA (US)

( * ) Notice: Subject to any disclaimer, the term of this patent is extended or adjusted under 35 U.S.C. 154(b) by 257 days.

This patent is subject to a terminal disclaimer.

(21) Appl. No.: 18/798,926

(22) Filed: Aug. 9, 2024

(65) Prior Publication Data

US 2024/0406817 A1 Dec. 5, 2024

Related U.S. Application Data

(63) Continuation of application No. 17/506,736, filed on Oct. 21, 2021, now Pat. No. 12,063,561.

(51) Int. Cl.

| | |
|---|---|
| ***H04W 36/04*** | (2009.01) |
| ***H04W 24/02*** | (2009.01) |
| ***H04W 36/00*** | (2009.01) |

(52) U.S. Cl.
CPC ..... *H04W 36/00835* (2018.08); *H04W 24/02* (2013.01); *H04W 36/0061* (2013.01); *H04W 36/04* (2013.01)

(58) Field of Classification Search
CPC ............ H04W 24/02; H04W 36/0061; H04W 36/00835; H04W 36/04; H04W 84/06
See application file for complete search history.

(56) References Cited

U.S. PATENT DOCUMENTS

| | | | | |
|---|---|---|---|---|
| 2019/0230530 | A1 | 7/2019 | Henriksson | |
| 2020/0404555 | A1 | 12/2020 | Ökvist | |
| 2021/0325550 | A1 * | 10/2021 | Wigard | H04W 24/02 |

FOREIGN PATENT DOCUMENTS

| | | | |
|---|---|---|---|
| CN | 109756914 A | * | 5/2019 |
| WO | WO-2017031384 | | 2/2017 |

OTHER PUBLICATIONS

U.S. Office Action dated Nov. 24, 2023 in U.S. Appl. No. 17/506,736.
(Continued)

*Primary Examiner* — Jeanette J Parker
*Assistant Examiner* — Dung L Lam
(74) *Attorney, Agent, or Firm* — Guntin & Gust, PLC; Andrew Gust

(57) ABSTRACT

An enhanced automatic neighbor relation ("ANR") function can estimate a plurality of terrestrial cells within a coverage area of an aerial cell. The enhanced ANR function can monitor an exchange of a serving cell unique identifier sent to a target cell and a target cell unique identifier sent to a serving cell. The enhanced ANR function can determine a serving cell type and a target cell type, wherein the serving cell type and the target cell type identify the serving cell and the target cell, respectively, as either a terrestrial cell type or an aerial cell type. The enhanced ANR function can then determine whether a serving cell neighbor relation table ("NRT") associated with the serving cell, a target cell NRT
(Continued)

associated with the target cell, or both would be compromised if a corresponding NR is added into the serving cell NRT and the target cell NRT.

20 Claims, 7 Drawing Sheets

(56) References Cited

OTHER PUBLICATIONS

U.S. Notice of Allowance dated Mar. 25, 2024 in U.S. Appl. No. 17/506,736.

* cited by examiner

OVERCOMING NEIGHBOR RELATION TABLE CONFLICTS AMONG TERRESTRIAL AND AERIAL CELLS IN MOBILE TELECOMMUNICATIONS NETWORKS

CROSS-REFERENCE TO RELATED APPLICATIONS

This application is a continuation of and claims priority to U.S. patent application Ser. No. 17/506,736, entitled "Overcoming Neighbor Relation Table Conflicts Among Terrestrial and Aerial Cells in Mobile Telecommunications Networks," filed Oct. 21, 2021, now allowed, which is incorporated herein by reference in its entirety.

BACKGROUND

Automatic Neighbor Relations ("ANR") is a self-optimization feature to dynamically build and maintain a neighbor relation table ("NRT") for each cell of a mobile telecommunications network. An ANR function can be deployed in a base station (e.g., an eNodeB ("eNB"), gNodeB ("gNB"), or combined eNB/gNB) and can manage the NRT for that base station. Alternatively, the ANR function can be implemented as part of another core network element, such as in a multi-access (or mobile) edge computing ("MEC") element, a RAN intelligent controller ("RIC"), or a self-organizing network ("SON") element. A user equipment ("UE"), such as a cellular smartphone, can detect and report neighboring cells to its serving cells. Reported neighboring cells are identified by a physical cell identifier ("PCI"). If the reported neighbor cell is not in the NRT of the serving cell, then the UE may be asked to read and report additional cell information, including a target cell identifier ("TCI"), such as an Evolved Universal Terrestrial Access Network ("E-UTRAN") Cell Global Identifier ("ECGI") in LTE. The serving cell can then request an IP address of the neighboring cell from an element management system ("EMS") operating in the core network of the mobile telecommunications network and establish a tunnel via the X2 interface. A neighbor relation ("NR") can be created between the EGCI/PCI/IP for the neighboring cell. Subsequent UEs only need to report the PCI. Then, the serving cell can start a handover to a neighboring cell using the established NRT.

When a new base station is established, it should select PCI values for all cells it supports. In Long-Term Evolution ("LTE") networks, the range of numbers for PCIs is 0-503 (504 in total); while in 5G networks, the range of numbers for PCIs is 0-1007 (1008 in total). A mobile telecommunications network may contain more cells than available PCIs, so the reuse of PCIs in different cells is unavoidable. Base stations therefore need to guarantee that PCI confusion and PCI collision can be avoided. PCI confusion occurs when the PCI of one cell is the same as the PCI of two different neighbor cells. PCI collision occurs when the PCI of neighbor cells are the same.

New base stations have no knowledge of the PCI values of their neighboring base stations. A self PCI configuration procedure has not been defined in standards. A common solution for this problem relies on mathematical models on a self-optimizing network ("SON") that searches all used PCI values in a given area. The SON solution will then assign an unused PCI to the new base station. If PCI collision/confusion is detected, the SON can re-assign/replace a new PCI to the new base station to avoid conflict. This approach may take several rounds of trial and error, and during this time, handover performance to/from the new base station may be impacted (e.g., handover failure or ping-pong effect).

In addition to terrestrial base stations, some mobile network operators use aerial base stations deployed on unmanned aerial vehicles ("UAVs"), such as drones, to expand coverage of an existing terrestrial-based radio access network ("RAN"), to overcome zoning limitations, and/or to cost-effectively deploy coverage in expensive locations. The integration of aerial base stations with terrestrial base stations through a heterogeneous network can be useful in seamless handoffs and increases user data capacity of the network. As described above, existing networks can use SON and ANR to dynamically build and maintain NRTs for each cell. Aerial cells may detect terrestrial cells that are far away from each other, and therefore can create NRs between these cells that may result in PCI confusion to PCI confusion/collision.

SUMMARY

Concepts and technologies disclosed herein are directed to overcoming NRT conflicts among terrestrial and aerial cells in mobile telecommunications networks. According to one aspect disclosed herein, an enhanced ANR function can be executed to estimate a plurality of terrestrial cells within a coverage area of an aerial cell. The enhanced ANR function can monitor an exchange of a serving cell unique identifier associated with a serving cell sent to a target cell and a target cell unique identifier associated with the target cell sent to the serving cell. The enhanced ANR function can determine a serving cell type and a target cell type. The serving cell type and the target cell type can identify the serving cell and the target cell, respectively, as either a terrestrial cell type that is associated with each of the plurality of terrestrial cells or an aerial cell type that is associated with the aerial cell. The enhanced ANR function can then determine whether a serving cell NRT associated with the serving cell, a target cell NRT associated with the target cell, or both would be compromised if a corresponding NR is added into the serving cell NRT and the target cell NRT. In response to determining that the serving cell type is an aerial cell type and the target cell type is an aerial cell type, the enhanced ANR function can determine that the serving cell NRT and the target cell NRT are compromised. In response to determining that the serving cell type is an aerial cell type or the target cell type is an aerial cell type, the enhanced ANR function can perform an ANR procedure with additional conditions. An additional condition may require the plurality of terrestrial cells to request a PCI and a unique cell identifier to differentiate cells when a UE requests a handover operation. Another additional condition may be to establish a duration timer for an NR associated with the aerial cell while the aerial cell is deployed. This duration timer can be shorter than a timer used for NRs associated with terrestrial cells. The additional condition may include a requirement that an NR association with the aerial cell is not to be added into any NRT of a cell operating as part of the network.

In some embodiments, the enhanced ANR function can determine the serving cell type and the target cell type based upon the serving cell unique identifier and the target cell unique identifier, respectively. The unique identifier can be Evolved Universal Terrestrial Access Network ("E-UTRAN") Cell Global Identifiers, although other cell identifiers are contemplated.

In some other embodiments, the enhanced ANR function can determine the serving cell type and the target cell type based upon a serving cell location associated with the serving cell and a target cell location associated with the target cell. Both the serving cell location and the target cell location can include a latitude, longitude, and altitude.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
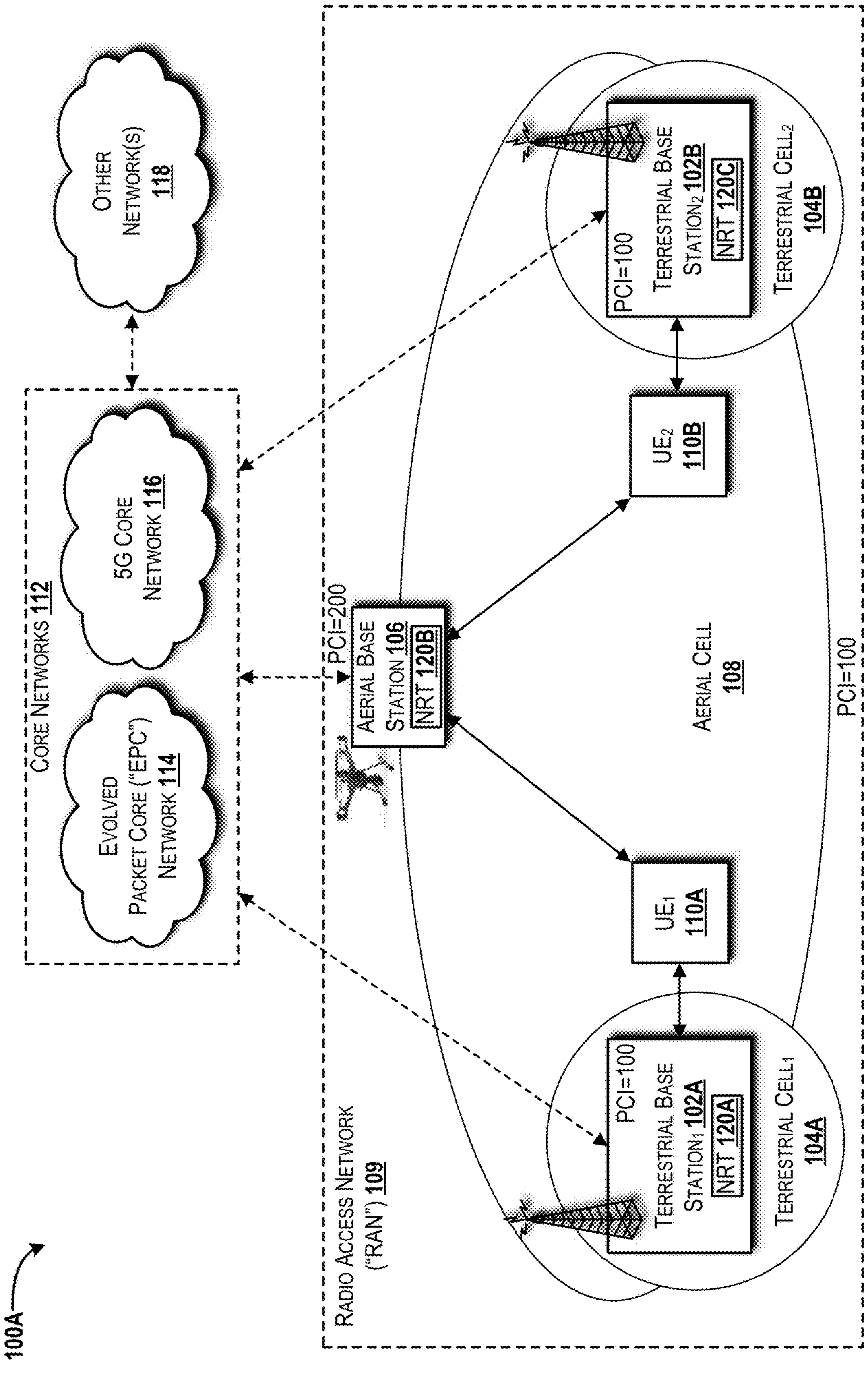
FIGS. 1A-1B are block diagrams illustrating aspects of an illustrative operating environment in which the concept and technologies disclosed herein can be implemented.

The concepts and technologies disclosed herein are directed to overcoming NRT conflicts among terrestrial and aerial cells in mobile telecommunications networks. More particularly, disclosed herein is an enhanced ANR learning procedure for heterogeneous terrestrial and aerial-based mobile telecommunications networks (e.g., LTE/5G). ANR is a self-optimization function that mandates a base station (e.g., eNB and/or gNB) to execute operations to orchestrate a dynamic communication between UEs and base stations to yield optimized NRTs. ANR can use the same operations for all base stations, including terrestrial and aerial deployed base stations. Additional operations can be implemented to enhance the ANR function and to overcome NRT conflicts among terrestrial and aerial cells.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies directed to overcoming NRT conflicts among terrestrial and aerial cells in mobile telecommunications networks will be described.

Referring now to FIG. 1A, an illustrative operating environment 100A in which the concepts and technologies disclosed herein can be implemented will be described. In the illustrated example, the operating environment 100A includes a first terrestrial base station ("terrestrial base station$_1$") 102A providing a first terrestrial cell ("terrestrial cell$_1$") 104A, a second terrestrial base station ("terrestrial base station$_2$") 102B providing a second terrestrial cell ("terrestrial cell$_2$") 104B, and an aerial base station 106 providing an aerial cell 108. The terrestrial base station$_1$ 102A, terrestrial base station$_2$ 102B, and the aerial base station 106 form, at least in part, a radio access network ("RAN") 109. Although only two terrestrial base stations 102 and one aerial base station 106 are shown in the illustrated example of the RAN 109, more than two terrestrial base stations 102 and more than one aerial base station 106 may be deployed as part of the RAN 109.

The RAN 109 can be configured in accordance with Third Generation Partnership Project ("3GPP") technical specifications for E-UTRAN and/or next generation ("5G") RAN architectures. As such, in some embodiments, the terrestrial base stations 102A, 102B and the aerial base station 106 can be or can include an eNodeB ("eNB"), a gNodeB ("gNB"), or a combined eNB/gNB. Those skilled in the art will appreciate the applicability of the concepts and technologies disclosed herein to other RAN architectures or variations of the aforementioned RAN architectures.

The terrestrial base stations 102A, 102B and the aerial base station 106 can provide a radio/air interface over which UEs 110A, 110B can connect to the RAN 109. The UEs 110A, 110B each may be a cellular phone (e.g., a feature phone or smartphone), a mobile computing device, a tablet computing device, a portable television, a portable video game console, or any other computing device that includes one or more radio access components that are capable of connecting to and communicating with one or more RANs, such as the RAN 109, via one or more radio access components. In some embodiments, a UE 110 can include an integrated or external radio access component that facilitates wireless communication with one or more RANs, such as the RAN 109. The radio access component may be a mobile device that is in wired or wireless communication with the UE 110 to facilitate a tethered data connection to one or more RANs. Alternatively, the radio access component includes a wireless transceiver configured to send data to and receive data from one or more RANs 109 and a universal serial bus ("USB") or another communication interface for connection to the mobile device so as to enable tethering. In any case, the UEs 110 can wirelessly communicate with one or more RANs over a radio/air interface in accordance with one or more radio access technologies ("RATs"). The UEs 110 may also initiate, receive, and maintain voice calls with one or more other voice-enabled telecommunications devices, such as other mobile devices or landline devices (not shown). The UEs 110 may also exchange Short Message Service ("SMS") messages, Multimedia Message Service ("MMS") messages, email, and/or other messages with other devices (not shown).

The terrestrial base stations 102A, 102B and the aerial base station 106 can provide dual connectivity for the UEs 110A, 110B to access an LTE cell and/or 5G-NR cell. As such, the terrestrial cells 104A, 104B and the aerial cell 108 in the illustrated example should be construed as LTE cells, 5G-NR cells, or combination LTE/5G-NR cells. This example, however, should not be construed as being limiting in any way.

The terrestrial cells 104A, 104B are geographical areas served by the terrestrial base stations 102A, 102B, respectively. Similarly, the aerial cell 108 is a geographical area served by the aerial base station 106. A mobile network operator ("MNO") can install the terrestrial base stations 102 to provide network access for the UEs 110 (and/or other devices that are not shown) in specific geographic locations. In some instances, the MNO may desire or need to deploy one or more aerial base stations, such as the aerial base station 106, to add coverage and/or capacity provided by the terrestrial cells 104A, 104B. For example, the aerial base station 106 may be deployed to provide additional coverage and/or capacity to support UEs subject to a disaster event (e.g., a hurricane) or during a social event (e.g., an outdoor concert). The aerial base station 106 can be deployed in areas of poor coverage by the terrestrial cells 104A, 104B, in areas that have zoning restrictions, or locations that are expensive to build in (e.g., city centers).

The aerial base station 106 can carry a small cell (e.g., a micro cell, pico cell, or femto cell) and antennas. Small cells are low-powered radio access nodes that usually have coverage range much smaller than macro cells (e.g., the terrestrial cells 104). A small cell base station is typically a low cost, small, and simple unit that connects to the RAN 109. The aerial base station 106 can provide benefits to improve data throughput for users, increase capacity in a network, and provide fill-in for no or poor coverage areas. The integration of aerial base stations, such as the aerial base station 106, with terrestrial base stations, such as the terrestrial base stations 102, through a heterogenous network can be useful in providing seamless handoffs and increasing user data capacity.

Figure 3:
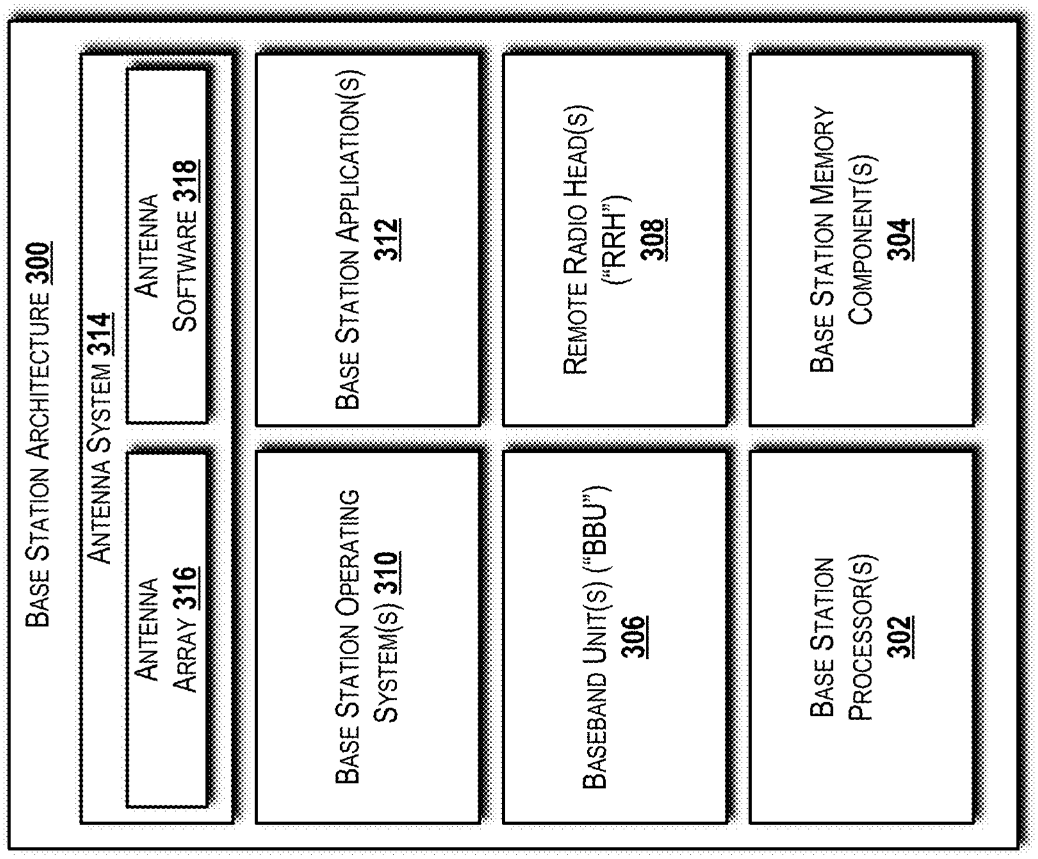
FIG. 3 is a block diagram illustrating aspects of an illustrative base station capable of implementing aspects of the embodiments presented herein.

The terrestrial base stations 102 and the aerial base station 106 can include one or more LTE radio components and/or one or more 5G-NR radio components to generate radio waves to be broadcast by an associated antenna system (best shown in FIG. 3). A more detailed base station architecture upon which the terrestrial base stations 102 and/or the aerial base station 106 can be based is illustrated and described herein with reference to FIG. 3.

The terrestrial base stations 102 and the aerial base station 106 are shown as being in communication with core networks 112, including an evolved packet core ("EPC") network 114 and a 5G core network 116. The core networks 112 are, in turn, in communication with one or more other networks 118 such as one or more other public land mobile networks ("PLMNs"), one or more packet data networks ("PDNs") (e.g., the Internet), combinations thereof, and/or the like. The UEs 110 can access services (not shown) provided, at least in part, via the other network(s) 118.

The terrestrial base stations 102 can connect to the EPC network 114, and more specifically, to a mobility management entity ("MME") (not shown) and a serving gateway ("S-GW") (also not shown). The EPC network 114 can include one or more MMEs, one or more S-GW (which may be combined with one or more packet gateways ("P-GWs"), and one or more home subscriber servers ("HSS"). Although not shown in the illustrated example, the EPC network 114 can include these network elements and may additionally include other network elements not specifically mentioned herein. In general, the EPC network 114 can be implemented based upon 3GPP technical specifications.

The core network components of the EPC network 114 can be implemented as physical network functions ("PNFs") having hardware and software components. The core network components of the EPC network 114 can additionally or alternatively be provided, at least in part, by virtual network functions ("VNFs"). For example, the core network components can be realized as VNFs that utilize a unified commercial-off-the-shelf ("COTS") hardware and flexible resources shared model with the application software for the respective core network components running on one or more virtual machines ("VMs"). Moreover, the core network components can be embodied as VNFs in one or more VNF pools, each of which can include a plurality of VNFs providing a particular core network function.

An MME can be configured in accordance with 3GPP standards specifications and can perform operations to control signaling traffic related to mobility and security for access to an eNB portion of the terrestrial base stations 102 and/or the aerial base station 106. The MME also can be in communication with an HSS. These network elements can communicate via interfaces that are defined as part of 3GPP technical specifications.

An SGW and a PGW can be configured in accordance with 3GPP technical specifications. The SGW can provide a point of interconnect between an eNB portion of the terrestrial base stations 102 and/or the aerial base station 106 and the EPC network 114. The SGW can serve the UEs 110 by routing incoming and outgoing IP packets between the eNB portion of the terrestrial base stations 102 and/or the aerial base station 106 and the EPC network 114. The PGW interconnects the EPC network 114 to the other networks 118. The PGW routes IP packets to and from the other network(s) 118. The PGW also performs operations such as IP address/prefix allocation, policy control, and charging. The SGW and the PGW can be in communication with the MME and with the other network(s) 118. These network elements can communicate via interfaces that are defined as part of 3GPP technical specifications.

An HSS can be configured in accordance with 3GPP technical specifications. The HSS is a database that contains user-related information for users of devices such as the UEs 110. The HSS can provide support functions to the MME for mobility management, call and data session setup, user authentication, and access authorization.

The MME and S-GW can be connected to the terrestrial base stations 102 and the aerial base station 106 at the edge of the EPC network 114. The CNB and the gNB portions of the terrestrial base stations 102 and the aerial base station 106 are logically different components that can communicate with each other via a standardized IP interface (i.e., the X2 interface). If the eNB and gNB are combined into a single hardware node, the X2 interface is an internal interface (or logical interface) between the two components.

The 5G core network 116 can include network functions that provide functionality similar to that of the EPC network 114 described above for LTE but for 5G technologies such as mmWave. For example, current 3GPP technical specifications define a 5G core network architecture as having an access and mobility management function ("AMF") that provides mobility management functionality similar to that of an MME in the EPC network 114; a session management function ("SMF") that provides session management functionality similar to that of an MME and some of the S/P-GW functions, including IP address allocation, in the EPC network 114; an authentication server function ("AUSF") managed subscriber authentication during registration or re-registration with the 5G core network 116; and user plane function ("UPF") combines the user traffic transport functions previously performed by the S/P-GW in the EPC network 114, among others. While 3GPP has defined some of these network functions, these network functions may be split into greater granularity to perform specific functions, may be combined, and/or additional functions may be added by the time the MNO deploys a live 5G network. As such, the 5G core network 116 is intended to encompass any and all 5G core network functions that are currently defined in technical specifications currently available and revisions thereof made in the future.

The operating environment 100A also illustrates a scenario during which PCI confusion and/or PCI collision may occur. In particular, the $UE_1$ 110A can connect to the terrestrial base $station_1$ 102A that provides the terrestrial $cell_1$ 104A having a PCI of 100. The aerial base station 106 can hover over an area, and due to the altitude of the aerial base station 106, the aerial base station 106 can cover a larger area than the terrestrial cells 104. This area is represented as the aerial cell 108 that overlaps, at least in part, the terrestrial $cell_1$ 104A and the terrestrial $cell_2$ 104B. The $UE_1$ 110A can discover the aerial cell 108 having a PCI of 200. The $UE_1$ 110A can report the PCI (=200) to its serving base station (i.e., the terrestrial base $station_1$ 102A in the illustrated example) and an X2 interface can be established between the terrestrial base $station_1$ 102A and the aerial base station 106 (now established neighbors). The terrestrial base $station_1$ 102A and the aerial base station 106 will add each other as a new NR into corresponding NRTs 120A, 120B.

In the illustrated example, the $UE_2$ 110B can connect to the terrestrial base $station_2$ 102B that provides the terrestrial $cell_2$ 104B also having a PCI of 100. The terrestrial $cell_2$ 104B is far enough away from the terrestrial $cell_1$ 104A that these two cells are not neighbors, thus no PCI conflicts exist between the terrestrial cells 104A, 104B. The $UE_2$ 110B can also discover the aerial cell 108 having a PCI of 200. The $UE_2$ 110B can report the PCI (=200) to its serving base station (i.e., the terrestrial base $station_2$ 102B in the illustrated example) and an X2 interface can be established between the terrestrial base $station_2$ 102B and the aerial base station 106 (now established neighbors). The terrestrial base $station_2$ 102B and the aerial base station 106 will add each other as a new NR into corresponding NRTs 120C, 120B. Thus, the aerial base station 106 now has a duplicated NR entry in the NRT 120B (i.e., terrestrial $cell_1$ PCI=100 and terrestrial $cell_2$ PCI=100). As a result, the aerial cell 108 now must handle PCI confusion issues. Under this situation, the aerial cell 108 may not be able to determine the correct destination for the handover target, thereby causing a handover failure.

Figure 1B:
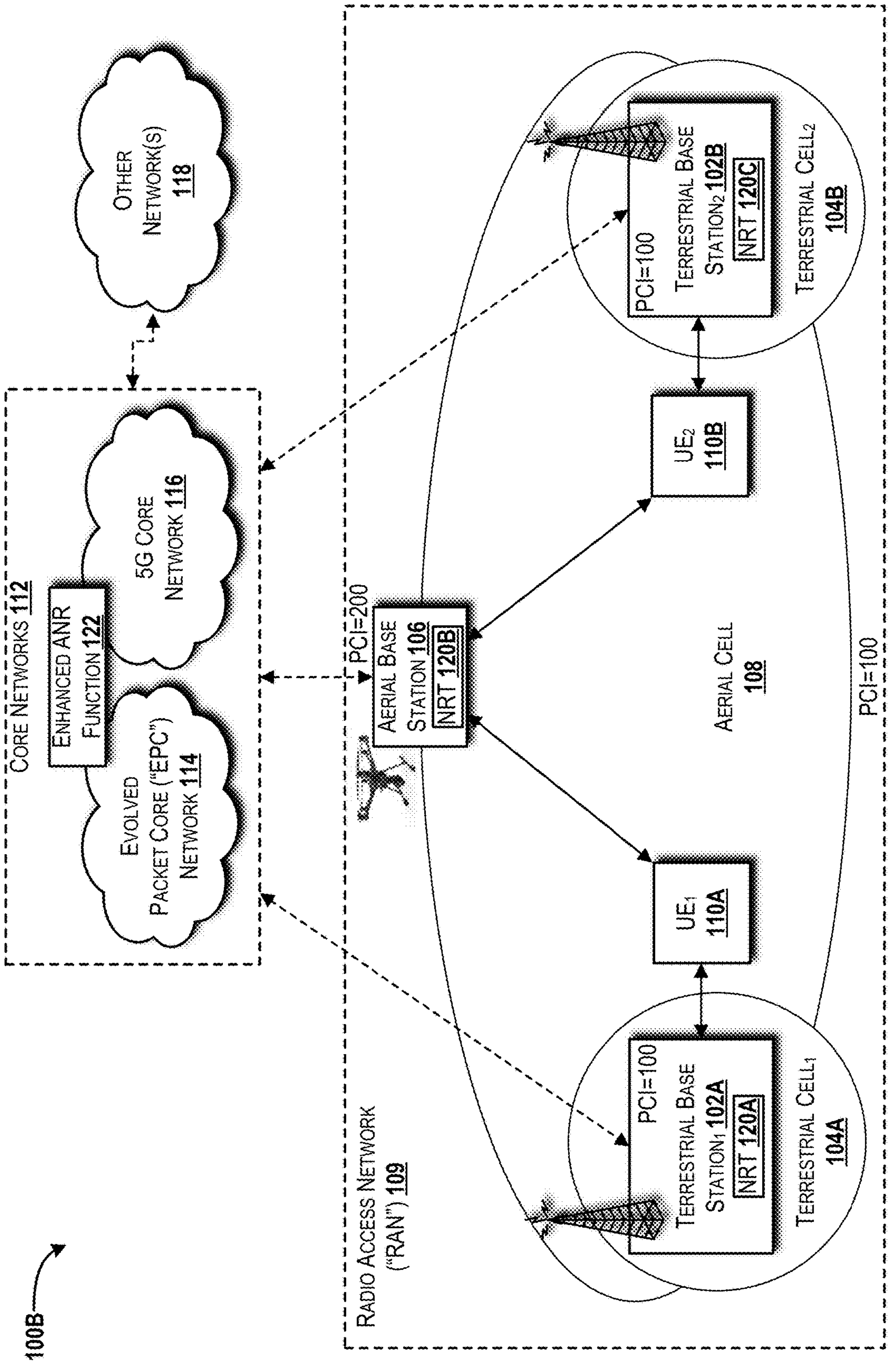

Turning now to FIG. 1B, an operating environment 100B capable of implementing a novel solution that addresses the aforementioned problem scenario will be described, according to an illustrative embodiment. The operating environment 100B is similar to the operating environment 100A except for an enhanced ANR function 122 deployed in the core networks 112. In the illustrated example, the enhanced ANR function 122 is shown as a single network element operating in communication with or as part of both the EPC network 114 and the 5G core network 116. Alternatively, the enhanced ANR function 122 may be deployed as two separate network elements, one operating in the EPC network 114 to provide support for LTE networks and another operating in the 5G core network 116 to provide support for 5G networks. In some embodiments, the enhanced ANR function 122 is a standalone network element. In some other embodiments, the enhanced ANR function 122 is implemented as part of another core network element, such as in a multi-access (or mobile) edge computing ("MEC") element, a RAN intelligent controller ("RIC"), or a self-organizing network ("SON") element. Implementations of the enhanced ANR function 122 as part of other network elements are also contemplated. As such, the example provided herein should not be construed as being limiting in any way. The enhanced ANR function 122 will be described in greater detail below with reference to FIG. 2.

Figure 2:
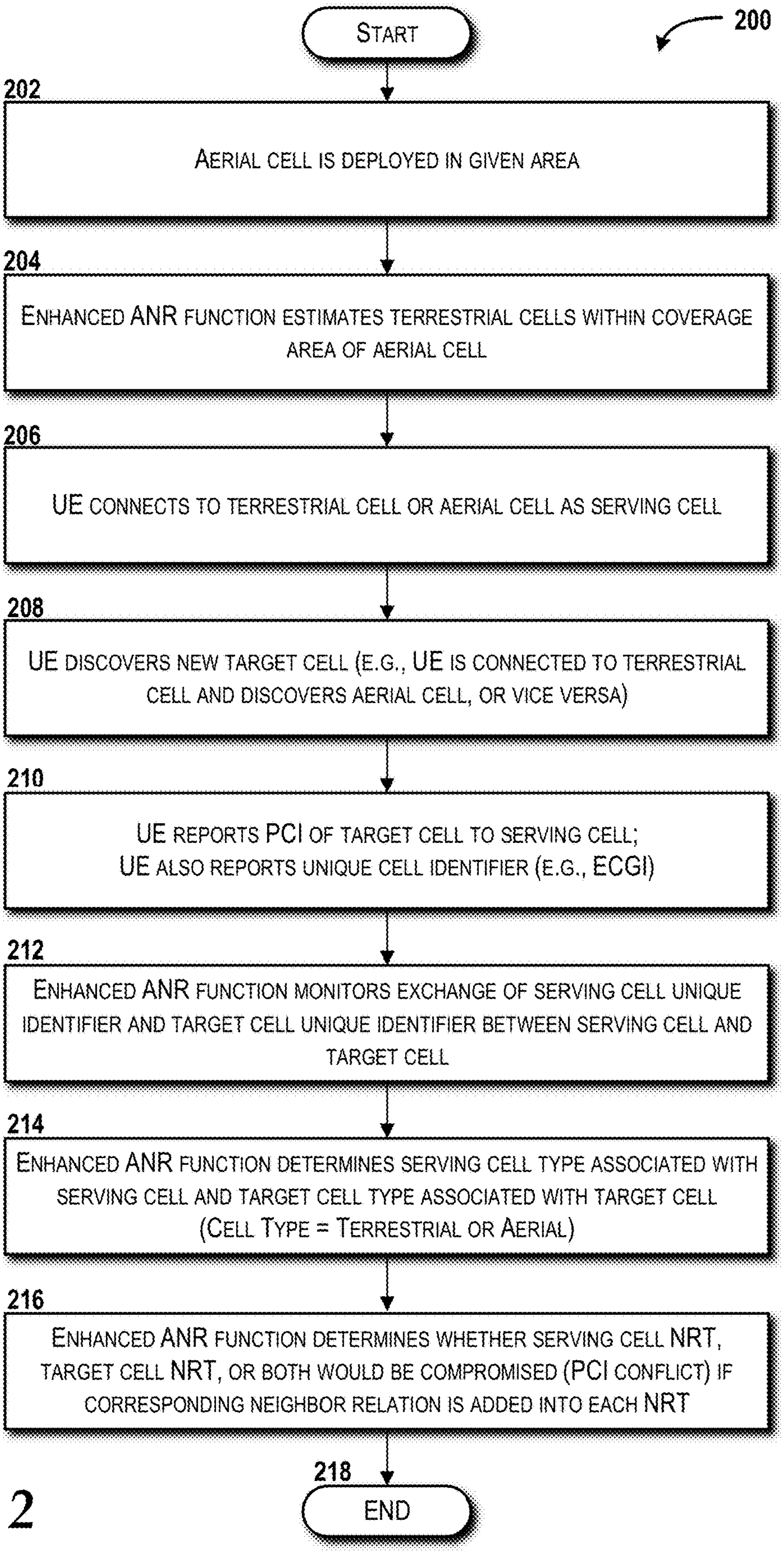
FIG. 2 is a flow diagram illustrating aspects of a method for enhancing an ANR learning procedure for heterogeneous terrestrial and aerial-based mobile telecommunications networks, according to an illustrative embodiment.

Turning now to FIG. 2, a flow diagram illustrating a method for enhancing an ANR learning procedure for heterogeneous terrestrial and aerial-based mobile telecommunications networks will be described, according to an illustrative embodiment. The method 200 will be described with additional reference to FIG. 1B. It should be understood that the operations of the methods disclosed herein are not necessarily presented in any particular order and that performance of some or all of the operations in an alternative order(s) is possible and is contemplated. The operations have been presented in the demonstrated order for case of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

The method 200 begins and proceeds to operation 202. At operation 202, an aerial cell, such as the aerial cell 108, is deployed. In particular, an aerial base station 106, can be launched and flown to a particular latitude/longitude/altitude location. The aerial cell 108 can provide a coverage area that overlaps, at least in part, a plurality of terrestrial cells 104, such as the terrestrial cells 104A, 104B shown in FIGS. 1A, 1B. From operation 202, the method 200 proceeds to operation 204. At operation 204, the enhanced ANR function 122 estimates the plurality of terrestrial cells 104 within the coverage area of the aerial cell 108. The enhanced ANR function 122 can utilize static locations of the terrestrial base stations 102, a known coverage area of the associated terrestrial cells 104, the latitude/longitude/altitude location of the aerial base station 106, and the known coverage area of the aerial cell 108, at least in part, to perform this estimation operation.

From operation 204, the method 200 proceeds to operation 206. At operation 206, a UE 110 can connect to one of the terrestrial cells 104 or to the aerial cell 108 as a serving cell. From operation 206, the method 200 proceeds to operation 208. At operation 208, the UE 110 discovers a new target cell. For example, if, at operation 206, the UE 110 is connected to a terrestrial cell 104, the UE 110 can discover the aerial cell 108 as the target cell. Alternatively, for example, if, at operation 206, the UE 110 is connected to the aerial cell 108, the UE 110 can discover a terrestrial cell 104 as the target cell.

From operation 208, the method 200 proceeds to operation 210. At operation 210, the UE 110 reports the PCI of the target cell to the serving cell. The UE 110 also reports a unique cell identifier (e.g., ECGI) of the target cell to the serving cell. From operation 210, the method 200 proceeds to operation 212. At operation 212, the enhanced ANR function 122 monitors an exchange of a serving cell unique identifier associated with the serving cell sent to the target cell and a target cell unique identifier associated with the target cell sent to the serving cell. From operation 212, the method 200 proceeds to operation 214.

At operation 214, the enhanced ANR function 122 determines a serving cell type associated with the serving cell and a target cell type associated with the target cell. The cell types can be either terrestrial or aerial. In some embodiments, the serving cell type and the target cell type can be determined based, at least in part, upon the unique cell identifiers of the serving cell and the target cell. In some other embodiments, the serving cell type and the target cell type can be determined based, at least in part, upon a serving cell location associated with the serving cell and a target cell location associated with the target cell. The serving cell and target cell locations can include a latitude value, a longitude value, and an altitude value.

From operation 214, the method 200 proceeds to operation 216. At operation 216, the enhanced ANR function 122 determines whether the NRTs 120 associated with the serving cell, the target cell, or both would be compromised (e.g., PCI conflict) if a corresponding NR is added into each NRT 120. In response to determining, at operation 214, that the serving cell type is an aerial cell type and the target cell type is an aerial cell type, the enhanced ANR function 122 can determine that the NRT 120 associated with the serving cell and the NRT 120 associated with the target cell are compromised. In response to determining, at operation 214, that the serving cell type is an aerial cell type or the target cell type is an aerial cell type, the enhanced ANR function 122 can perform an ANR procedure with additional conditions. An additional condition may require the plurality of terrestrial cells to request, from an aerial cell, a PCI and a unique cell identifier to differentiate cells when a UE requests a handover operation. Another additional condition may be to establish a duration timer for an NR associated with the aerial cell while the aerial cell is deployed. This duration timer can be shorter than a timer used for NRs associated with terrestrial cells to limit the time during which the aerial cell may cause a PCI conflict. The additional condition may include a requirement that an NR association with the aerial cell is not to be added into any NRT.

From operation 216, the method 200 proceeds to operation 218. The method 200 can end at operation 218.

Turning now to FIG. 3, an example base station architecture 300 illustrating aspects of a terrestrial base station 102 or an aerial base station 106 introduced above with respect to FIGS. 1A, 1B will be described. For the aerial base station 106, the base station architecture 300 can be deployed on a UAV such as a drone. As such, the base station architecture 300 can be sized appropriately to be carried by the UAV. Alternatively, the UAV may include the base station architecture 300.

The example base station architecture 300 illustrated in FIG. 3 includes one or more base station processors 302, one or more base station memory components 304, one or more baseband units ("BBUs") 306, one or more remote radio heads ("RRHs") 308, one or more base station operating systems 310, one or more base station applications 312, and an antenna system 314, including an antenna array 316 and antenna software 318. Each of these components will now be described in detail.

A base station processor 302 can include one or more processing units configured to process data, execute computer-executable instructions of one or more application programs, and communicate with other components of the base station architecture 300 in order to perform various functionality described herein. The base station processor 302 may be utilized to execute aspects of the base station operating system(s) 310 and the base station application(s) 312. In some embodiments, the base station processor 302 is or includes a central processing unit ("CPU"), a communications processor, or a field-programmable gate array ("FPGA"). In some embodiments, the base station processor 302 is or is included in a system-on-a-chip ("SoC") along with one or more of the other components described herein below. For example, the SoC may include the base station processor 302, a graphics processing unit ("GPU"), the BBU(s) 306, the RRH(s) 308, or some combination thereof. In some embodiments, the base station processor 302 is fabricated, in part, utilizing a package-on-package ("PoP") integrated circuit packaging technique. Moreover, the base station processor 302 may be a single core or multi-core processor. The base station processor 302 may be created in accordance with an ARM architecture, available for license from ARM HOLDINGS of Cambridge, United Kingdom. Alternatively, the base station processor 302 may be created in accordance with an x86 architecture, such as is available from INTEL CORPORATION of Mountain View, California and others. In some embodiments, the base station processor 302 is a SNAPDRAGON SoC, available from QUALCOMM of San Diego, California, a TEGRA SoC, available from NVIDIA of Santa Clara, California, a HUMMINGBIRD SoC, available from SAMSUNG of Scoul, South Korea, an OMAP SoC, available from TEXAS INSTRUMENTS of Dallas, Texas, a customized version of any of the above SoCs, or a proprietary SoC.

The base station memory components 304 can include a random access memory ("RAM"), a read-only memory ("ROM"), an integrated storage memory, and a removable storage memory, or some combination thereof. In some embodiments, the base station memory components 304 store the base station operating system(s) 310 or a portion thereof (e.g., operating system kernel or bootloader), and/or the base station application(s) 312.

The BBU 306 is the baseband processing unit of the base station architecture 300. The BBU 306 can include other components shown, including, for example, the base station processor(s) 302, the base station memory component(s) 304, the base station operating system(s) 310, the base station application(s) 312, or some combination thereof. The BBU 306 can receive IP packets from the EPC network 114 and/or the 5G core network 116 (see FIGS. 1A, 1B) and can modulate the IP packets into digital baseband signals. The BBU 306 can send the digital baseband signals to the RRH(s) 308. The digital baseband signals received by the RRH(s) 308 can be demodulated and IP packets can be transmitted to the EPC network 114 and/or the 5G core network 116. The RRH(s) 308 can transmit and receive wireless signals to/from devices such as the UEs 110. The RRH(s) 308 also convert the digital baseband signals from the BBU 306 that have been subjected to protocol-specific processing into RF signals and power amplifies the signals for transmission to the devices such as the UEs 110. The RF signals received from the devices are amplified and converted to digital baseband signals for transmission to the BBU 306.

The base station operating system 310 is a program for controlling the operation of the base station architecture 300. The base station operating system 310 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

A base station application 312 can be any application that performs operations for the base station architecture 300. For example, the base station application(s) 312 can be or can include software compliant with 3GPP technical specifications for call control processing, performance management, self-organizing network functions, and the like.

Figure 4:
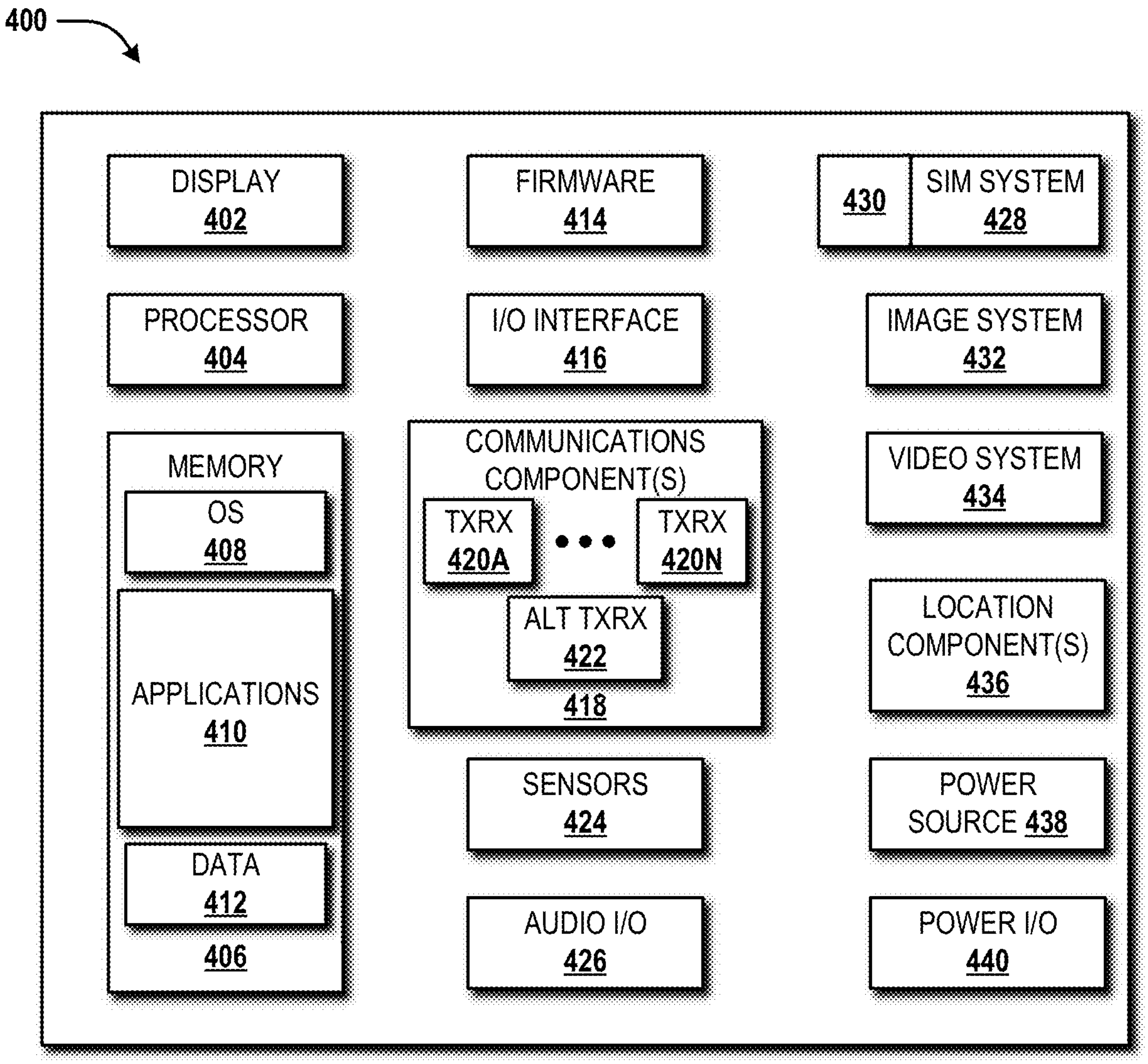
FIG. 4 is a block diagram illustrating an example mobile device, according to an illustrative embodiment.

Turning now to FIG. 4, an illustrative mobile device 400 and components thereof will be described. In some embodiments, the UEs 110 described above with reference to FIGS. 1A, 1B can be configured as and/or can have an architecture similar or identical to the mobile device 400 described herein in FIG. 4. It should be understood, however, that the UEs 110 may or may not include the functionality described herein with reference to FIG. 4. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display output of network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in the memory 406, or the like. In some embodiments, the applications 410 also can include a UI application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in data communications, entering/deleting data, entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 that can be stored at the mobile device 400.

The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using Global System for Mobile communications ("GSM"), Code Division Multiple Access ("CDMA"), CDMAONE, CDMA2000, LTE, 5G technologies such as mmWave, and various other 2G, 2.5G, 3G, 4G, 4.5G, 5G, Non-Stand-Alone ("NSA"), Stand-Alone ("SA"), and greater generation technology standards. Moreover, the communications component 418 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency Division Multiple Access ("OFDM"), Space Division Multiple Access ("SDMA"), and the like.

In addition, the communications component 418 may facilitate data communications using GPRS, EDGE, the HSPA protocol family including HSDPA, EUL or otherwise termed HSUPA, HSPA+, and various other current and future wireless data access standards. In the illustrated embodiment, the communications component 418 can include a first transceiver ("TxRx") 420A that can operate in a first communications mode (e.g., GSM). The communications component 418 also can include an Nth transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418. A carrier aggregation scheme may be used to combine the throughput of the individual transceivers 420 on the uplink or downlink to increase the effective bandwidth of communications.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC"), eSIM, and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 500 described below with reference to FIG. 5. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
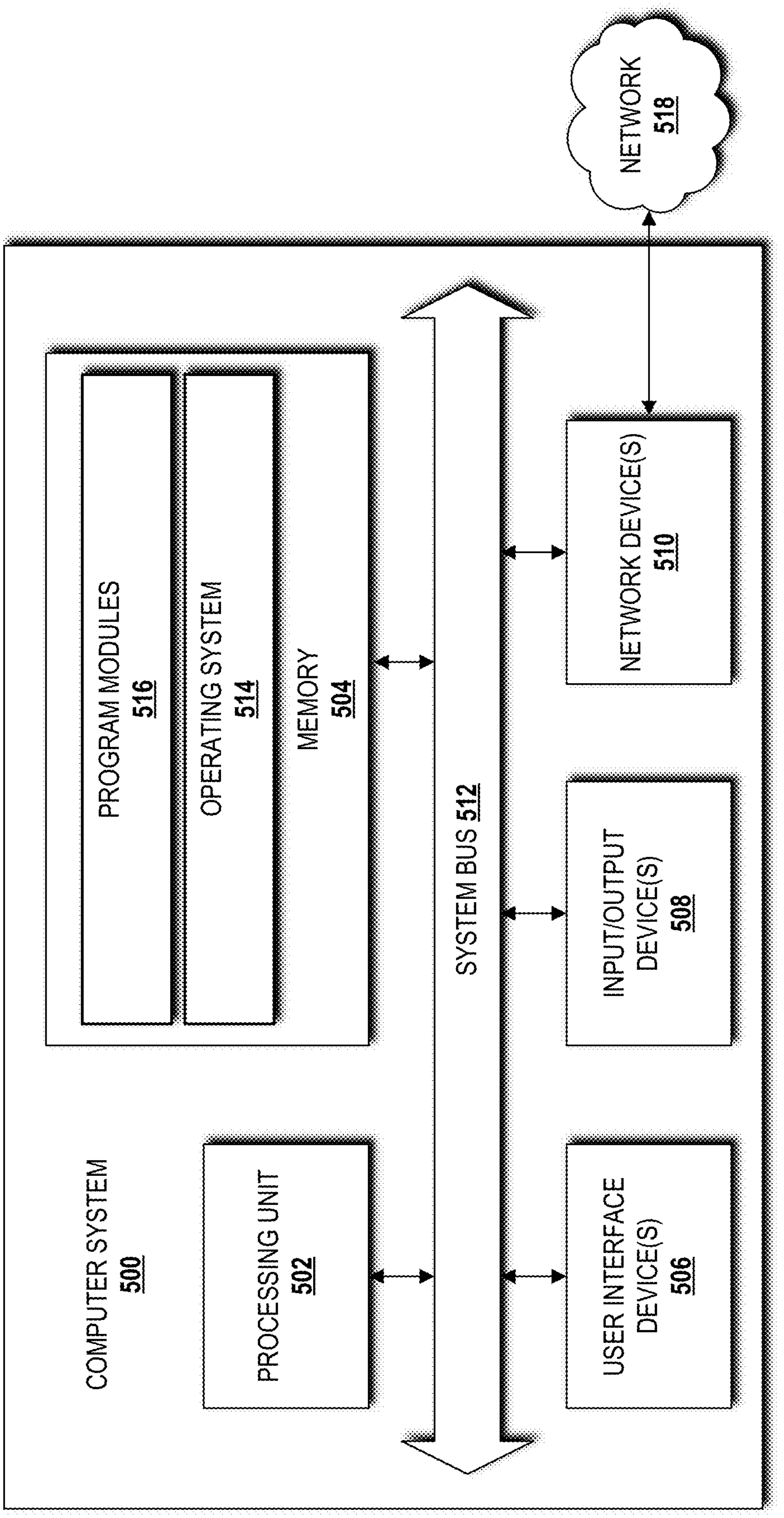
FIG. 5 is a block diagram illustrating an example computer system capable of implementing aspects of the embodiments presented herein.

Turning now to FIG. 5 is a block diagram illustrating a computer system 500 configured to provide the functionality in accordance with various embodiments of the concepts and technologies disclosed herein. The systems, devices, and other components disclosed herein can utilize, at least in part, an architecture that is the same as or at least similar to the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media, and therefore should be construed as being directed to "non-transitory" media only.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518, such as the RAN 109, the core networks 112, and/or the other networks 118. Examples of the network devices 510 include, but are not limited to, a modem, a radio frequency ("RF") or infrared ("IR") transceiver, a telephonic interface, a bridge, a router, or a network card. The network 518 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be or may include a wired network such as, but not limited to, a Wide Area Network ("WAN"), a wired Personal Area Network ("PAN"), or a wired Metropolitan Area Network ("MAN").

Figure 6:
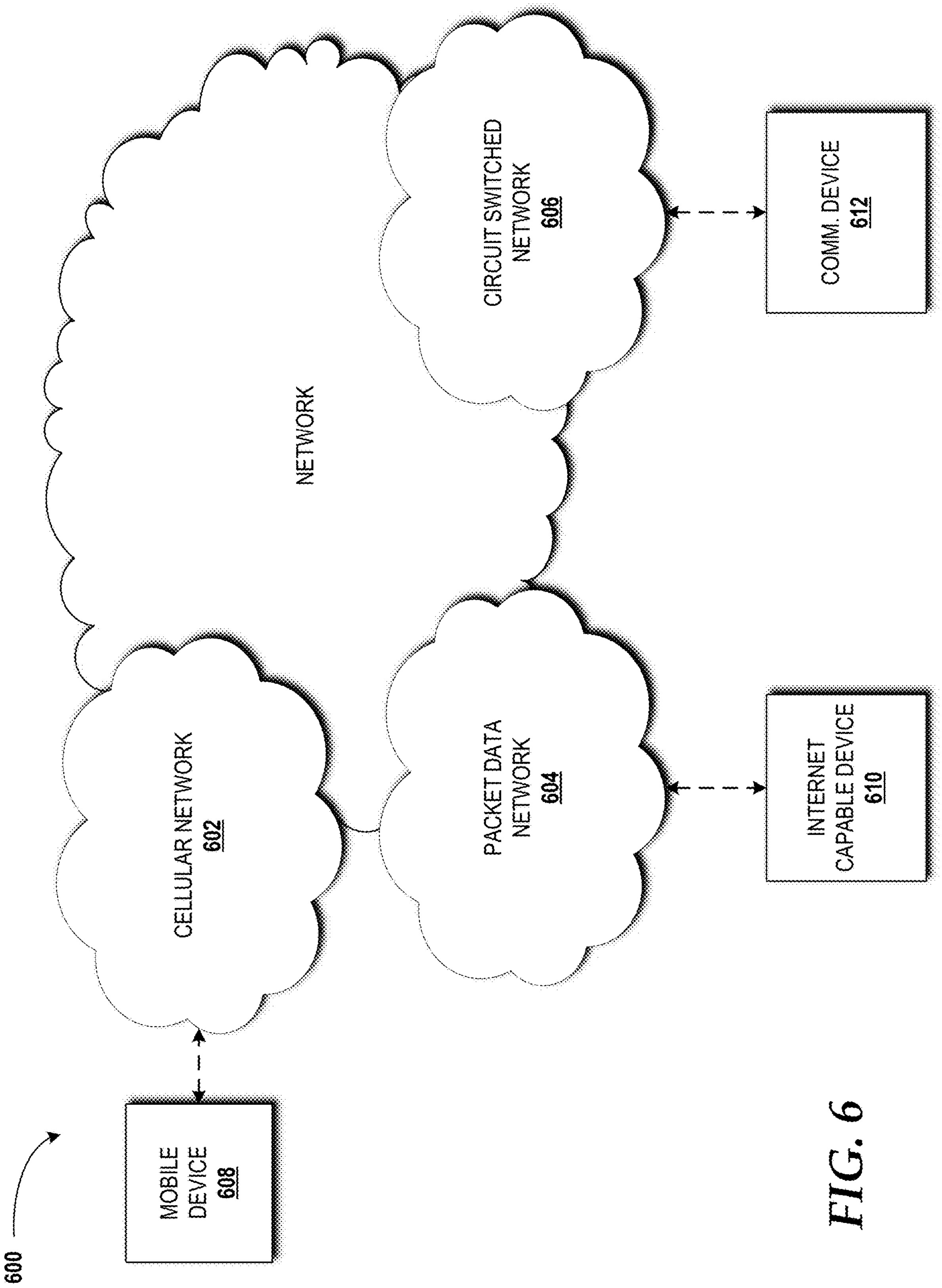
FIG. 6 is a diagram illustrating a network, according to an illustrative embodiment.

Turning now to FIG. 6, details of a network 600 are illustrated, according to an illustrative embodiment. In some embodiments, the network 600 can include the RAN 109, the core networks 112, and/or other networks 118. The network 600 includes a cellular network 602, a packet data network 604, for example, the Internet, and a circuit switched network 606, for example, a public switched telephone network ("PSTN"). The cellular network 602 includes various components such as, but not limited to, the terrestrial base stations 102, the aerial base station 106, base transceiver stations ("BTSs"), NBs or eNBs, combination eNB/gNB, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, the core networks 112 and associated network elements, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the UEs 110, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards such as 5G (e.g., mmWave).

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606 shown in FIG. 6. It should be appreciated that substantially all of the functionality described with reference to the network 600 can be performed by the cellular network 602, the packet data network 604, and/or the circuit switched network 606, alone or in combination with other networks, network elements, and the like.

Based on the foregoing, it should be appreciated that concepts and technologies directed to overcoming neighbor relation table conflicts among terrestrial and aerial cells in mobile telecommunications networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:

estimating, by an enhanced automatic neighbor relations function executed by a processor, a plurality of terrestrial cells within a coverage area of an aerial cell;

monitoring, by the enhanced automatic neighbor relations function, an exchange of a serving cell unique identifier associated with a serving cell sent to a target cell and a target cell unique identifier associated with the target cell sent to the serving cell;

determining, by the enhanced automatic neighbor relations function, a serving cell type and a target cell type, wherein the serving cell type and the target cell type identify the serving cell and the target cell, respectively, as either a terrestrial cell type that is associated with each of the plurality of terrestrial cells or an aerial cell type that is associated with the aerial cell; and determining that at least one of the serving cell type and the target cell type is an aerial cell type;

in response to determining that at least one of the serving cell type and the target cell type is an aerial cell type, determining, by the enhanced automatic neighbor relations function, that adding a corresponding neighbor relation into at least one of a serving cell neighbor relation table associated with the serving cell and a target cell neighbor relation table associated with the target cell would compromise at least one of the serving cell neighbor relation table and the target cell neighbor relation table.

2. The method of claim 1, wherein determining, by the enhanced automatic neighbor relations function, the serving cell type and the target cell type comprises determining the serving cell type and the target cell type based upon the serving cell unique identifier and the target cell unique identifier, respectively.

3. The method of claim 1, wherein determining, by the enhanced automatic neighbor relations function, the serving cell type and the target cell type comprises determining the serving cell type and the target cell type based upon a serving cell location associated with the serving cell and a target cell location associated with the target cell.

4. The method of claim 3, wherein both the serving cell location and the target cell location comprise a latitude value, a longitude value, and an altitude value.

5. The method of claim 1, wherein the serving cell unique identifier and the target cell unique identifier are both Evolved Universal Terrestrial Access Network Cell Global Identifiers.

6. The method of claim 1, further comprising, in response to determining that at least one of the serving cell type and the target cell type is an aerial cell type, performing an automatic neighbor relation procedure with an additional condition.

7. The method of claim 6, wherein the additional condition comprises:

requiring the plurality of terrestrial cells to request a physical cell identifier and a unique cell identifier to differentiate cells when a user equipment requests a handover operation;

while the aerial cell is deployed, establishing a duration timer for a neighbor relation associated with the aerial cell; or requiring that a neighbor relation associated with the aerial cell is not to be added into any neighbor relation table.

8. A system comprising:

a processor; and a memory comprising instructions for an enhanced automatic neighbor relations function that, when executed by the processor, cause the processor to perform operations comprising estimating a plurality of terrestrial cells within a coverage area of an aerial cell, monitoring an exchange of a serving cell unique identifier associated with a serving cell sent to a target cell and a target cell unique identifier associated with the target cell sent to the serving cell, determining, a serving cell type and a target cell type, wherein the serving cell type and the target cell type identify the serving cell and the target cell, respectively, as either a terrestrial cell type that is associated with each of the plurality of terrestrial cells or an aerial cell type that is associated with the aerial cell, and in response to determining that at least one of the serving cell type and the target cell type is an aerial cell type, determining that adding a corresponding neighbor relation into at least one of a serving cell neighbor relation table associated with the serving cell and a target cell neighbor relation table associated with the target cell would compromise at least one of the serving cell neighbor relation table and the target cell neighbor relation table.

9. The system of claim 8, wherein determining the serving cell type and the target cell type comprises determining the serving cell type and the target cell type based upon the serving cell unique identifier and the target cell unique identifier, respectively.

10. The system of claim 8, wherein determining the serving cell type and the target cell type comprises determining the serving cell type and the target cell type based upon a serving cell location associated with the serving cell and a target cell location associated with the target cell.

11. The system of claim 10, wherein both the serving cell location and the target cell location comprise a latitude value, a longitude value, and an altitude value.

12. The system of claim 8, wherein the serving cell unique identifier and the target cell unique identifier are both Evolved Universal Terrestrial Access Network Cell Global Identifiers.

13. The system of claim 8, wherein the operations further comprise, in response to determining that at least one of the serving cell type and the target cell type is an aerial cell type, performing an automatic neighbor relation procedure with an additional condition.

14. The system of claim 13, wherein the additional condition comprises:

requiring the plurality of terrestrial cells to request a physical cell identifier and a unique cell identifier to differentiate cells when a user equipment requests a handover operation;

while the aerial cell is deployed, establishing a duration timer for a neighbor relation associated with the aerial cell; or requiring that a neighbor relation associated with the aerial cell is not to be added into any neighbor relation table.

15. A computer-readable storage medium comprising computer-executable instructions for an enhanced automatic neighbor relations functions that, when executed by a processor, cause the processor to perform operations comprising:

estimating a plurality of terrestrial cells within a coverage area of an aerial cell;

monitoring an exchange of a serving cell unique identifier associated with a serving cell sent to a target cell and a target cell unique identifier associated with the target cell sent to the serving cell;

determining, a serving cell type and a target cell type, wherein the serving cell type and the target cell type identify the serving cell and the target cell, respectively, as either a terrestrial cell type that is associated with each of the plurality of terrestrial cells or an aerial cell type that is associated with the aerial cell; and in response to determining that at least one of the serving cell type and the target cell type is an aerial cell type, determining that adding a corresponding neighbor relation into at least one of a serving cell neighbor relation table associated with the serving cell and a target cell neighbor relation table associated with the target cell would compromise at least one of the serving cell neighbor relation table and the target cell neighbor relation table.

16. The computer-readable storage medium of claim 15, wherein determining the serving cell type and the target cell type comprises determining the serving cell type and the target cell type based upon the serving cell unique identifier and the target cell unique identifier, respectively.

17. The computer-readable storage medium of claim 15, wherein determining the serving cell type and the target cell type comprises determining the serving cell type and the target cell type based upon a serving cell location associated with the serving cell and a target cell location associated with the target cell.

18. The computer-readable storage medium of claim 17, wherein both the serving cell location and the target cell location comprise a latitude value, a longitude value, and an altitude value.

19. The computer-readable storage medium of claim 15, wherein the operations further comprise, in response to determining that at least one of the serving cell type and the target cell type is an aerial cell type, performing an automatic neighbor relation procedure with an additional condition.

20. The computer-readable storage medium of claim 19, wherein the additional condition comprises:

requiring the plurality of terrestrial cells to request a physical cell identifier and a unique cell identifier to differentiate cells when a user equipment requests a handover operation;

while the aerial cell is deployed, establishing a duration timer for a neighbor relation associated with the aerial cell; or requiring that a neighbor relation associated with the aerial cell is not to be added into any neighbor relation table.

* * * * *